Jan. 12, 1960 E. F. McDONALD, JR 2,920,604

REMOTE CONTROL DEVICE

Filed Oct. 4, 1957 3 Sheets-Sheet 1

Inventor
Eugene F. McDonald Jr.
By John J. Pederson
Attorney

Jan. 12, 1960 E. F. McDONALD, JR 2,920,604

REMOTE CONTROL DEVICE

Filed Oct. 4, 1957 3 Sheets-Sheet 2

Inventor
Eugene F. McDonald Jr.
By John J. Pederson
Attorney

Jan. 12, 1960 E. F. McDONALD, JR 2,920,604

REMOTE CONTROL DEVICE

Filed Oct. 4, 1957 3 Sheets-Sheet 3

Inventor
Eugene F. McDonald Jr.
By John J. Pederson
Attorney

United States Patent Office 2,920,604

Patented Jan. 12, 1960

2,920,604

REMOTE CONTROL DEVICE

Eugene F. McDonald, Jr., Chicago, Ill.; Eugene M. Kinney and Edward McCausland, executors of said Eugene F. McDonald, Jr., deceased Application October 4, 1957, Serial No. 688,258

1 Claim. (Cl. 116—137)

This invention relates to a new and improved control system for remotely controlling such devices as television sets. The system includes a transmitter for generating ultrasonic waves which act upon a receiver carried by the set to permit of adjustment of the set in several different modes of adjustment; for example, turning the set on or off, muting the sound, and/or changing channels to which the set will respond. The invention is more particularly directed to the provision of automatic control of the duration of the signal developed by the transmitter, so as to preclude multiple mode adjustments in response to a single manual transmitter operation.

The invention is particularly adapted for use in an ultrasonic remote control system such as that employed in the "Space Command" television sets manufactured and sold by Zenith Radio Corporation of Chicago, Illinois since June 1956. The "Space Command" system is described in the magazine Electronics, issue of March 1, 1957, pages 156–167, entitled Ultrasonic Gong Controls TV Sets, by Robert Adler, Peter Desmares and John Spracklen.

In the Zenith "Space Command" remote control system, ultrasonic vibrations in the region of 40 kilocycles (kc.) are radiated from a control transmitter comprising different vibrating rods which are struck by hammers to send forth signals that are picked up by a receiver microphone at the television set. The microphone is coupled in a control chassis containing a high gain 40 kc. amplifier. The control chassis contains limiter, discriminator and integrator circuits for frequency detection and noise discrimination. The received signal is amplified and multiplied to its third harmonic which is detected to initiate the control function; the on and off control circuit operates at approximately 113 kc., the mute or volume control operates at approximately 116 kc., right movement of the channel selector operates at approximately 124 kc. and left movement of same operates at approximately 121 kc. It is to be understood, of course, that these figures are set up merely by way of example and that any suitable frequencies may be used in accordance with the teachings of the invention. The signal so produced is limited to a given amplitude, and integrating means are provided so that only incoming signals persisting for a predetermined minimum period of time are effective to cause actuation of relays to effect the desired mode adjustment. Such an arrangement of circuitry provides protection from undesired operation of the system from such sources as jingling of keys, which set up noises that may contain sporadic components at the wavelengths of the control signals generated by the resonant bars of the transmitter.

The system is also provided with a manually actuated signal damping means in the transmitter that is operable to damp vibrations upon release of the push buttons used to excite vibration of the resonators. It has been found, however, that under certain circumstances, when the manually actuated signal damping means is held out of operation for too long, more than one control operation, e.g., channel change step, may be effected for each given operation of the manually operated actuating mechanism in the transmitter. In addition, because of the fact that the device is adapted to operate close to the television set as well as at relatively remote distances therefrom, which range for practical purposes may be considered to be from five feet to forty feet, for example, the minimum signal strength to which the amplifying system and actuating system is to respond is of necessity that of the signal received at the greatest distance. Inasmuch as the control waves are partially dissipated in the atmosphere as they traverse the maximum distance, it has been found desirable to have substantial gain in the amplifying system. However with high gain, when the device is used close to the set, it has been found that stations may be passed by in operation. In other words, the device may cause stepping of more than the desired single step for each actuation of the manual means in the transmitter.

Accordingly, it is a principal object of this invention to provide a new and improved ultrasonic transmitter in which but a single control operation is obtained for any given single operation of the control means at the transmitter.

A more specific object of the invention is to provide a transmitter having a timed mechanism that will operate equally well when held in any of several positions to transmit a signal of predetermined duration.

In accordance with the present invention, an ultrasonic transmitter for use in a remote control system for a television receiver or the like comprises a resonator adapted to be excited into longitudinal-mode ultrasonic vibration at a frequency predetermined by the geometry of the resonator. Manually operable mechanical means are provided for exciting the resonator into longitudinal-mode vibration to cause it to produce a continuous ultrasonic acoustical wave of the above-mentioned predetermined frequency, and time-delayed damping means responsive to actuation of the exciting means are also provided for controlling the duration of the acoustical wave.

The features of the invention which are believed to be new are set forth with particularly in the appended claim. The invention, together with further objects and advantages thereof, may best be understood, however, by reference to the following description taken in conjunction with the accompanying drawings in which:

Figure 4:
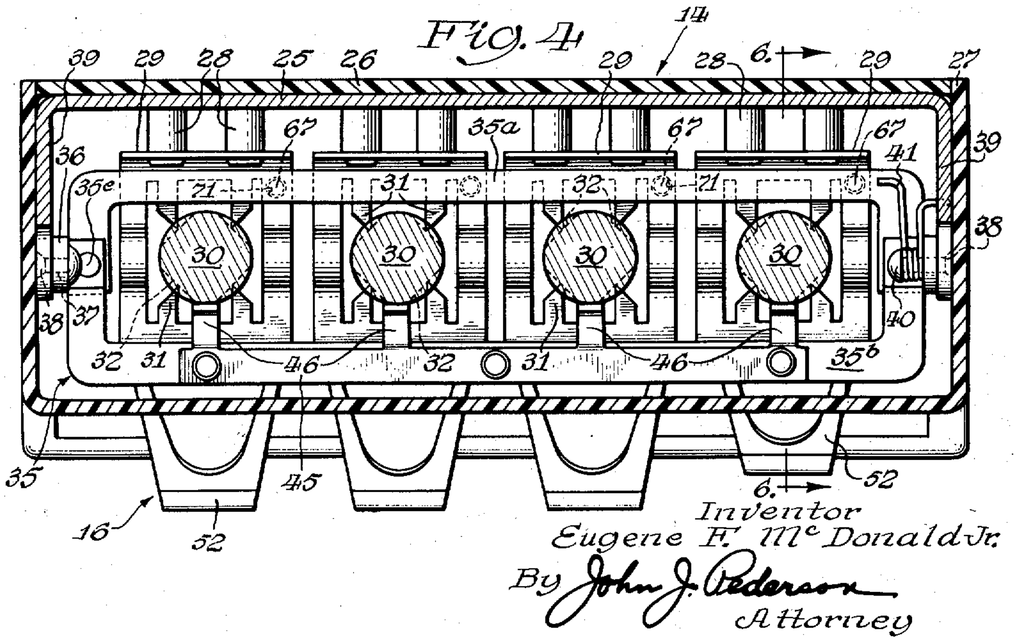
Figure 4 is a plan section of a preferred form of transmitter taken above the damping means therein, and showing four signal resonators.
Figures 5, 6, 7:
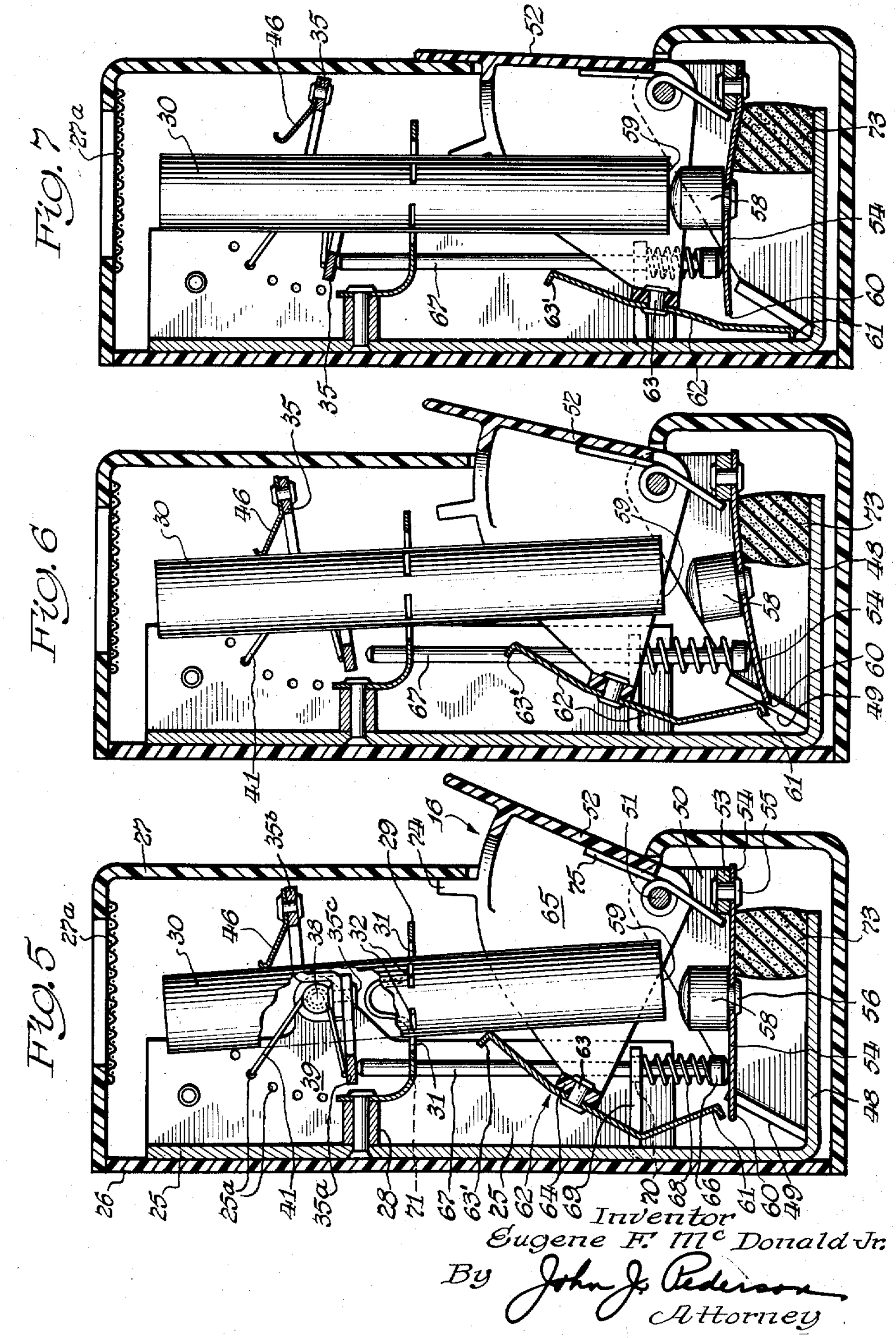
Figures 8, 9, 10:
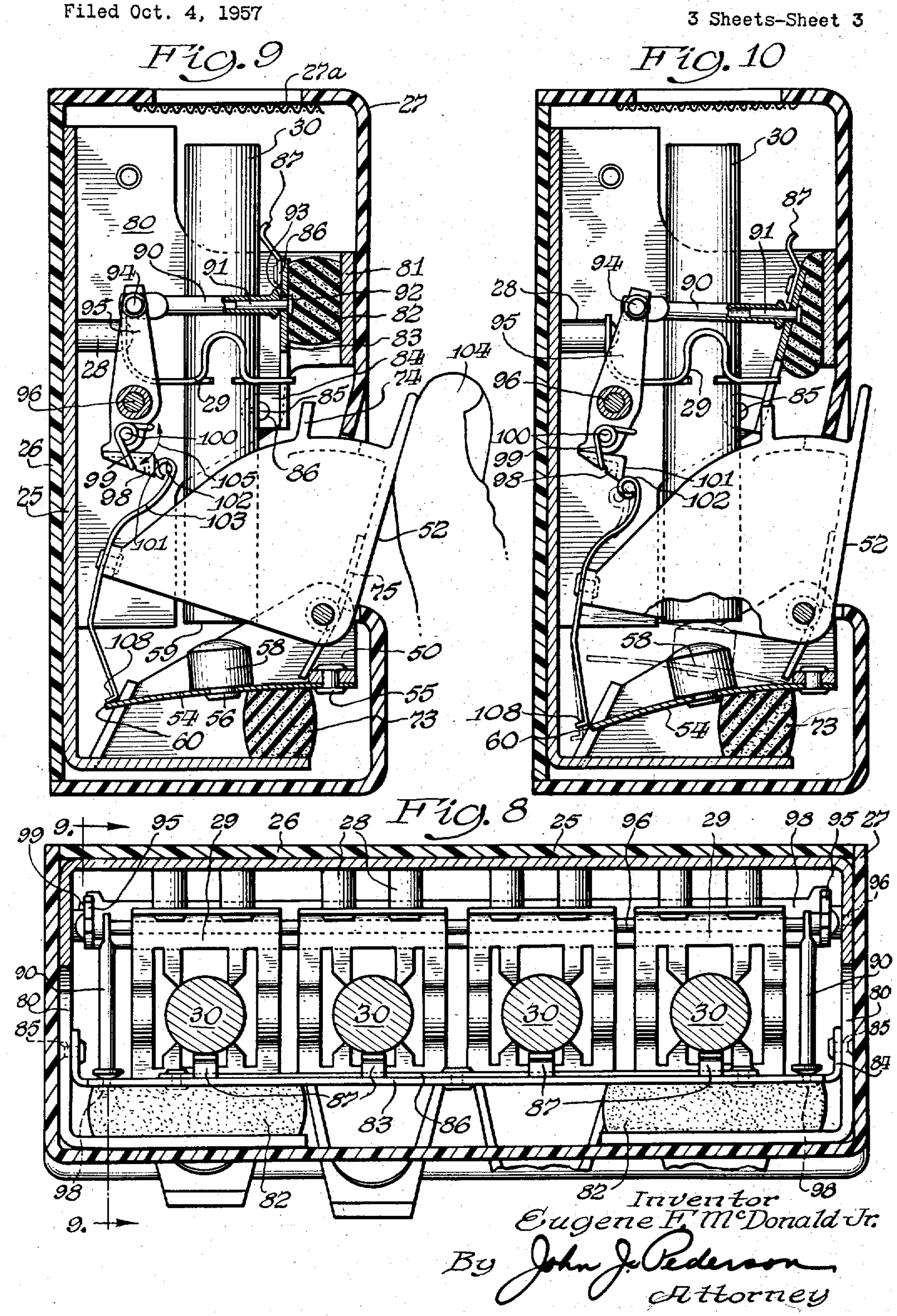

Figures 5, 6 and 7 are all sectional views taken substantially along the line 6—6 of Figure 4, illustrating the parts in various operating positions; and Figures 8, 9 and 10 are a plan section, and two elevational sectional views respectively of an alternative transmitter embodying the invention.

Figures 1, 2, 3:
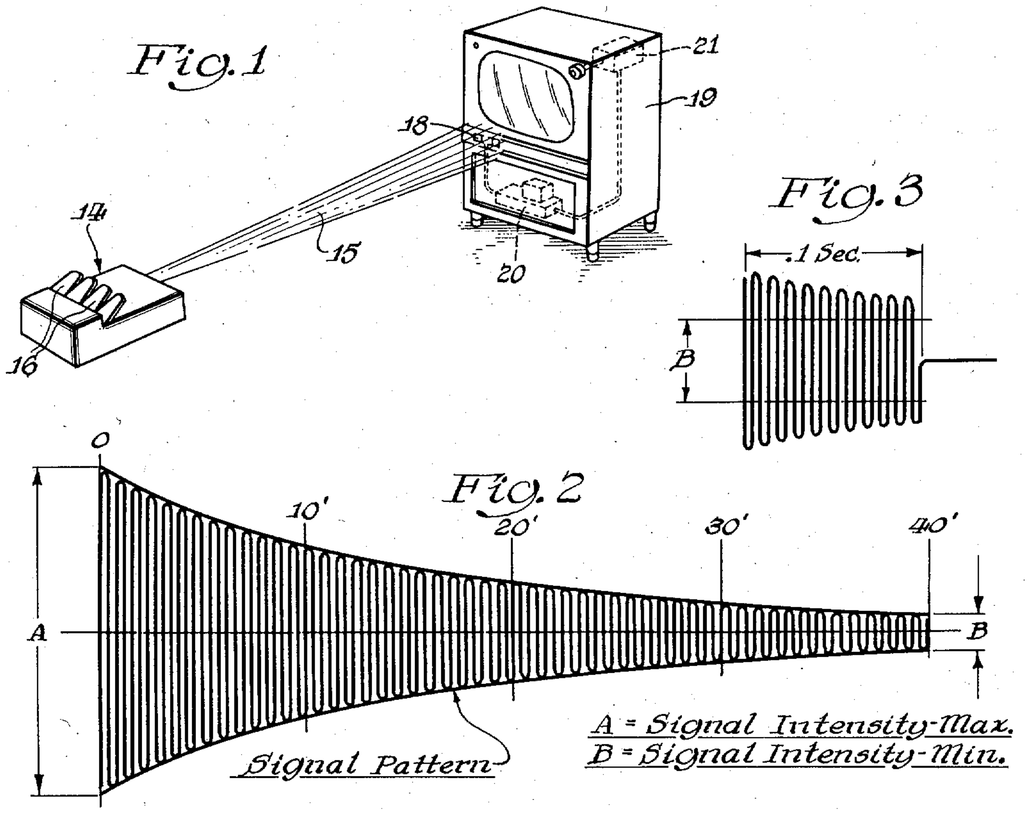
Figure 1 is a diagrammatic view showing the combination of a television receiver and a transmitter, such as disclosed in detail in the present application.
Figure 2 is a diagrammatic view of a signal pattern such as generated by the transmitter of Figure 1.
Figure 3 is a diagrammatic view of a typical useful portion of the signal pattern illustrated in Figure 2.

Referring more in detail to the drawing, and first to Figure 1, a transmitter 14 is adapted to generate an ultrasonic signal that is diagrammatically represented at 15 upon depression of any of a plurality of push buttons 16 that may be manually depressed to effect any of different desired control functions, such as volume control, station selection, and others, as desired. While four buttons and signal generators are shown in the present application, it is to be understood that more or less than this number can be utilized as desired to accomplish different purposes in the manner herein taught.

The signal 15 is received by a microphone 18 carried in a television receiver 19 wherein an amplifier and control circuit 20 of the kind used in the "Space Command" receivers. Amplifier and control circuit 20 responds to the signal 15 generated by the transmitter 14 to effect a mode adjustment in the television set, such as causing a tuning mechanism 21 to select different channels depending upon the number of times that the channel selector button 16 on the transmitter 14 is depressed and released.

As appears more clearly below, and in accordance with the invention, the combination of the transmitter 14 and the control circuit 20 is constructed and arranged to accomplish but a single predetermined control function in the television set for each single depression of a button 16 on the transmitter 14. Thus if it is desired to change from one channel to the next, the proper button 16 is depressed but once. If it is desired to change over two channels the button 16 is depressed twice, etc. With the four-resonator modification about to be described, it is possible to move the channel selector either to the right or to the left with two of the buttons, as well as to turn the set on and off with another of the buttons, and to mute the sound with the fourth button 16.

The signal pattern shown in Figure 2 is of diagrammatic nature, with signal intensity plotted as a function of distance from the transmitter, and the maximum signal intensity A occurs immediately adjacent the output end of the transmitter 14. The control signal naturally diminishes in intensity as it traverses a distance through the atmosphere due to partial dissipation of its energy in the air. To permit control of the television set from any location in the room in which it may be located, the system is designed to provide a minimum signal intensity B at a distance of 40 feet from the transmitter.

Figure 3, in which the received control signal is plotted as a function of time, exemplifies the desired control signal at the receiver to perform the selected mode adjustment. The signal pattern illustrated in Figure 3 is shown as persisting for substantially 0.1 second in time whereas the control signal generated by the resonator may remain above threshold intensity B for as long as 0.3 second, depending on the distance from the receiver. The receiver is made unresponsive to control signals of shorter duration to avoid false actuation as by jingling keys. In the "Space Command" system, however, the received control system may remain above the threshold intensity B for substantially longer than the time required to initiate the selected control function, since the transmitter resonator is damped only upon release of the actuating button, and in some instances it has been found that failure to release the transmitter button may result in effecting consecutive mode adjustments. Such undesired operating condition is precluded, according to the present invention, by limiting the persistence interval of the control signal generated at the transmitter to a time duration less than that required to effect consecutive mode adjustments and preferably to a time duration only slightly in excess of the minimum required to initiate the selected control function. In practice, it has been found that the transmitter persistence interval should be limited to about 0.12 second to achieve the desired result without undesirably reducing the control range or overall versatility of the system.

In the specific transmitter structure of Figures 4–7, the device comprises four resonator assemblies each comprising identical parts except for the signal generating rods which differ from each other in length to produce control waves of different frequencies. Accordingly only one of such transmitters is described in detail, and similar reference characters are applied to identical parts throughout the several views. The transmitter is built up about a formed steel base 25 that is suitably backed with a fibre backing plate 26 which fits into a cover 27 having a screen 27*a* permitting passage of the control signal waves. These parts are suitably secured together after the internal assembly is made upon base 25.

First referring to Figure 4, which shows only the upper portion of the mechanism of the transmitter for purposes of clarity in the sectional plan view, the base 25 carries pins 28 which mount spring clips 29 that hold half-wave resonator or vibrator bars 30 in place at their mid-points. This mid-point comprises a natural node of the wave which the bars 30 generate. The springs 29 have fingers 31 that engage milled slots 32 to maintain the bars 30 both against rotational and transverse movements, except that movement permitted by the resilient structure of the springs 29.

A spring-mass pendulum dynamic damper 35 in the form of an open rectangular frame is shown in plan in Figure 4, and has a rear half 35*a* and a front half 35*b* secured together by rivets 35*c*. The damper 35 has ears 36 at its ends provided with pivot holes 37 to receive pins 38 carried in ears 39 on the sides of the base 25. The right hand pin 38 is provided with a head 40 to retain a clothes-pin type spring 41. The spring 41 has one end secured in a hole 25*a* in the base and the other end of the spring engages the surface of damper 35 and tends to rotate same counter-clockwise as viewed from the left, at all times. It is also to be noted that the damper 35 completely surrounds and is normally uniformly spaced from the sides of the resonator bars 30. The reason for this will appear more clearly below in connection with the description of Figures 5–7.

The lower part (as shown in Figure 4) of the damper frame 35 carries on its upper surface a metal spring stamping 45 which has integral fingers 46 that are arranged to engage the surfaces of the resonator bars 30 at points displaced from their nodal planes. As will appear below, while the fingers 46 are in engagement with the resonator bars 30 the same are damped because the point of engagement is such that resonant waves cannot long exist when such engagement is present. It is also to be noted, in connection with the other figures, that when one of the bars 30 is in position for resonating it is placed in a position with relationship to its cooperative damping finger 46 so that it receives all of the force of the spring 41 in the subsequent timed damping of the longitudinal-mode vibrations of the bar.

Figure 5 is a side view of the right hand resonator bar 30 shown in Figure 4 and looking toward the right. The lower portion of the transmitter unit containing the manual and spring actuating mechanism for exciting the resonator bars into longitudinal-mode vibration will now be described. The base 25 has an upturned bottom plate 48 from which a cam surface 49 is struck up and side surfaces 50 are bent up to carry a pin 51 forming a pivot for an operating button 16 in the form of a bell-crank lever 52, and an ear 53 for supporting a cantilever main spring 54 by means of a rivet 55. The main spring 54, in turn by means of a rivet connection 56, carries a striking element or hammer 58 which is adapted to impinge on an end surface 59 of the resonator bar 30 when the mechanism is placed into operation. The spring 54 has a distal end 60 adapted to be engaged by an end 61 of a cocking spring 62 carried by a rivet 63 on a cross bar 64 mounted between a pair of flanges 65 comprising the sides of the bell-crank lever 52. The end 61 is also adapted to engage the cam surface 49 so as to disengage the distal end 60 of the spring 54 to release same and permit it to snap in a manner to be described below.

The end of the spring 54 engages an enlarged end 66 of a push rod 67 of light weight construction (for example aluminum tubing or the like) which is urged by a spring 68 downward from a bracket 69 struck out from the base 25. The rod 67 is guided by a hole 70 in the bracket 69 and a hole 71 in the spring 29 mounting the resonator bar 30 to give the rod two spaced guide points for its function to be described below.

A vibration damping soft rubber block 73 is suitably secured, as by gluing, between the lower portion 48 of the frame 45 and the bottom surface of the hammer spring 54 for a vibration damping function to appear below.

The operating bell-crank lever 52 normally is maintained in the position shown in Figure 5 with a stop 74 in engagement with the inside of the cover 27, by a biasing spring 75 mounted on the pin 51 and having a leg that engages the ear 53 on the frame portion 50 to create the proper bias.

Referring now to Figure 6, the lever 52 is shown in substantially the position of the right hand lever 52 in Figure 4. It is to be noted that the upper end 63' of the spring 62 is out of engagement with the resonator bar 30 and the lower end 61 has depressed the distal end 60 of the spring 54 to a point where it is about to leave engagement therewith because the spring 62 is constrained to slide down the cam surface 49 and the distal end 60 moves relatively inwardly with respect thereto. At this point in the operation of the device, the spring 68 is relaxed because the head 66 of the rod 67, under the influence of spring 68, has followed the upper surface of the main spring 54 downward as it is flexed. The damper spring finger 46 at this point exerts pressure against the right hand side of the resonator bar 30 at a point between the end of the bar and the central nodal plane where the bar 30 is mounted upon the suspension spring 29. The tension of the spring 41 determines the magnitude of the force exerted by the damping spring 46. However, it is to be noted that the entire force of the spring 41 is exerted upon the damping finger engaging the single resonator bar 30 which is about to be excited, because this particular bar will be substantially upright, whereas the other three bars will remain tilted due to pressure of the cocking spring ends 63'.

Referring now to Figure 7, the mechanism is shown immediately following disengagement of the end 61 of the spring 62 and the distal end 60 of the main spring 54. Under the influence of the spring 54, the push rod 67 has forced the damper frame 35 into substantially the position shown wherein the damper spring finger 46 is out of engagement with the side of the resonator bar 30. The hammer 58 at this point has just struck the bottom surface 59 of the resonator bar 30 and initiated ultrasonic wave longitudinal-mode vibration therein at a frequency and with an intensity determined by the dimensions and the material employed. This wave is radiated from the upper end of the bar 30, through the screen **27*a*, and toward the television set as shown in Figure 1. Each resonator bar 30** is preferably made of a piece of aluminum rod of predetermined length corresponding to one-half wavelength at the desired control signal frequency. For the four frequencies set forth, there are four different lengths of rod, although the cross-sectional area may be identical.

After the hammer 58 strikes the end of the bar 30, the hammer rebounds. Repeated impact of the hammer 58 on bar 30 is prevented by the soft rubber block 73. The push rod 67, when released, also returns to the position shown in Figure 5 to augment this damping function.

*Operation*

Starting with the parts in the position shown in Figure 5, the lever 52 is pressed toward the left to cause same to rotate around the pivot 51 against the bias of spring 75 which normally holds same in the position shown with the stop 74 on the lever 52 engaging the interior of the case 27. Counter-clockwise rotation of the lever 52 forces the operating spring 62 downward so that the end 61 engages the top surface of the main spring 54 carrying the hammer 58. The distal end 60 of spring 54 clears the cam 49 and the end 61 of spring 62 engages same. As shown in Figure 6, the spring end 61 is just about to disengage the distal end 60 of the main spring 54. Upon disengagement of these spring ends the parts move instantly into the position shown in Figure 7. In this position the rod 67 is driven to its upper most limit which causes the damper mechanism to begin an excursion to be described later. The hammer 58 impinges sharply on the end surface of the resonator bar 30, delivering a single blow thereto and bouncing downwardly to be damped. The spring-biased damper frame 35 constitutes a pendulum which has begun an excursion in the position shown in Figure 7 and will travel a distance somewhat further than that shown. Excess clockwise rotation of same is limited by the left sides of the unactuated bars 30 which remain in tilted position at the time of the excitation of one of the bars 30. The normal limit of such excursion is preferably not this far, however. Such pendulums have inherent substantially constant time periods of oscillation, even though the length of the path traversed may vary to some extent. The present device takes advantage of this characteristic.

It is to be noted that the spring fingers 46 are all disengaged from the bars 30 upon rotation of damper frame 35, and that the bar being excited as shown in Figure 7 receives all of the force of the spring 41 when the damper bar 30 returns in a counter-clockwise direction to cause engagement of the spring finger 46 with the resonator bar 30. The other bars 30, at this time, remain tilted out of position for engaging a spring finger 46. The spring 41 and the mass of parts **35*a* and 35*b* are selected so as to provide a time of excursion from the position shown in Figure 7 back to the position shown in Figure 5 of approximately 0.12 second. Moreover, the parts 35*a* and 35*b* are balanced about the pivots 38 so the transmitter operates reliably regardless of its orientation in the hand of the user. Since the parts 35*a* and 35*b*** displace air during their excursion, viscous damping of predetermined degree depending upon the dimension of the damper frame is also obtained by this structure.

Spring 41 partially counteracts the pendulum action of damper frame 35 because force is dissipated by friction when spring 46 slides on the surface of bar 30, and thus serves to inhibit repeated excursions thereof, so that the damper is restored to its initial state in readiness for another transmitter operation at any time. In this manner, the advantages of the invention are achieved regardless of the number or the rapidity of transmitter control operations.

Referring now in detail to that form of the invention shown in Figures 8, 9 and 10, a device which relies in part on the energy applied by finger of the operator in depressing the lever 41 is disclosed. In this respect this modification differs fundamentally from the embodiment of Figures 4–7. To accomplish this different type of operation a different form of timed actuator is brought into use, and a modification of the operating spring 62 is used. The upper end of the operator spring energizes the time delay structure at the time that the hammer 58 is released to activate the resonator bar 30. This modification also makes use of a different time delay characteristic than that of pendulum type damping, by using the slow rate of return of such damping devices as a piece of sponge rubber, to be described. As will be clear from the following disclosure, a bellows or some other escapement mechanism (which takes time to move through a given path) may also be utilized. The present structure moves freely, but relatively slowly, in one sense, and is forced manually in the opposite sense of movement. In the case of an escapement mechanism or a dashpot, the same may be bypassed in one direction and permitted to operate for timing only in the other direction. Inasmuch as such structures are believed to be equivalents in the art, these have not been disclosed, and are mentioned here only as being encompassed by the spirit of the modifications herein disclosed.

Because the resonator parts and the actuator are substantially identical to those disclosed in connection with the previous modification, the same reference characters are used herein and such parts will not be redescribed.

A side flange 80 of the base 25 carries an extension 81 to which is secured a suitable timing mechanism, here shown as a pair of blocks of sponge rubber 82 that are cemented or otherwise suitably retained between the interior surface of the flange 81 and the facing surface of a lever 83. A characteristic of such rubber, or a suitable plastic, is relatively slow recovery upon being compressed. This time of recovery can be modified further by proportioning of the mass moved by the rubber, in accordance with the disclosure of the previous modification, if desired. The lever 83 extends perpendicular to the plane of the paper as viewed in Figures 9 and 10 entirely across the casing between the end flanges 80. The ends of the lever 83 have turned in ears 84 that are carried upon pivot pins 85 mounted in holes in the flanges 80. The arm 83 carries a spring member 86 which has four spring fingers 87 that cooperate with the surfaces of the resonator bars 30 for contacting same after a predetermined period of time regulated by the rate of recovery of the blocks of sponge rubber 82. The sponge rubber is compressed upon the operation of the lever 52, and released in the course of its operation, in a manner to be described below, in order to provide a timed interval when a spring finger 87 is away from the resonator bar 30 that is under excitation so that it can generate standing waves for a predetermined time, as in the manner described above in connection with the previous modification.

A pair of push bars, each in the form of a tube 90, cooperate with a slip pin 91 that has a head 92 larger than a hole 93 in the lever 83 to transfer rotative motion thereto from the lever 52. The pin 92 is held in place by the rubber block 82. The left hand end of the tube 90 is carried upon a pivot pin 94 mounted on the upper end of a lever 95 that is in turn carried upon a pivot rod 96 journaled in the flanges 80 at each of its ends. There are two levers 95, and each is welded or otherwise secured to the rod 96 so that they are moved simultaneously regardless of which lever 52 is pushed to compress the rubber blocks 82. A transverse trip bar 98 is mounted between the lower ends of the levers 95 upon a pair of pins 100 and biased into the position shown by a spring 99 to present a cam surface 101. The cam surface 101 is engaged by the surfaces 102 of the ends of springs 103 for compressing the sponge rubber blocks 82 under the influence of the operator's finger 104 when the lever 52 is depressed. The bar 98 will follow a path 105 on the return operation (not shown) so that spring end 102 can cause rotation of the trip bar 98 in the counter clockwise direction to permit passage of the end 102 under same to trigger the mechanism for a subsequent operation.

*Operation*

The operation of the device disclosed in Figures 8, 9 and 10 is as follows:

The operator's finger 104 is pressed against the lever 52 to rotate it in a counter clockwise direction; in Figure 9, lever 52 has been partially depressed, and the spring end 108 engage the distal end 60 of the main spring 54, the upper end 102 of spring 103 initially engaging the cam surface 101 of the trip bar 98. Additional pressure of the finger 104 causes further flexing of the spring 54 and compression of the blocks of rubber 82 to substantially the position shown in Figure 10. In Figure 10, in solid and dotted lines, the parts are shown in the positions just prior to disengagement of the distal ends 108 and 60 of the springs 103 and 54 and just subsequent to disengagement of said ends. Upon disengagement of the ends 108 and 60, the amount of resistance at that time opposed by pressure of the operator's finger 104 is substantially reduced so that the finger itself provides the last bit of energy in instantaneous manner to cause instantaneous release of spring end 102 from cam surface 101 of the bar 98. Thus the parts go into the dotted line position shown in Figure 10 with the hammer 58 rising abruptly under influence of the spring 54 to the dotted line position to strike the bottom end of the resonator bar 30 to excite same and bounce back to be damped in its later oscillations by the damper 73 connected thereto in the manner described more fully in connection with the preceding modification. Upon disengagement of the end 102 of spring 103 from the cam surface 101, the pressure upon the sponge rubber 82 is released and the arm 83 immediately begins to move at the rate of recovery of the rubber 82 in a counter clockwise direction. The weight of parts is so selected and proportioned that the finger 87 of the spring member 86 moves into engagement with the side of the resonator bar 30 that has been excited in approximately 0.12 second in order to accomplish the damping of the wave persisting in the bar at such time, to limit the duration of the generated control signal so that multiple mode adjustments per transmitter operation are precluded.

According to the above description it is seen that there has been provided by the present invention, new and improved remote control system in which remote control functions are initiated by ultrasonic control signals generated by a transmitter requiring no cords, wires, batteries or electrical parts. The system of the invention provides not only ample discrimination against random noise components, but also precludes erroneous or undesired multiple mode adjustments per transmitter operation.

While particular embodiments of the invention have been shown and described, it will be obvious to those skilled in the art that changes and modifications may be made without departing from the invention in its broader aspects, and, therefore, the aim in the appended claim is to cover all such changes and modifications as fall within the true spirit and scope of the invention.

I claim:

A transmitter for generating compressional wave signals of different frequencies comprising: a supporting base; a plurality of elongated vibrators excitable into longitudinal-mode vibration at individually different frequencies; resilient means, affixed between said base and said vibrators, holding and urging said vibrators into side-by-side alignment in a common plane; a damping element of a width sufficient to laterally span said vibrators; means movably supporting said damping element from said base in a position adjacent and laterally spanning said vibrators and retarding movement of said damping element in a direction toward said vibrators; resilient means, anchored from said base, urging said damping element toward said vibrators; a plurality of striker assemblies carried by said base and positioned individually adjacent the ends of said vibrators with each assembly including movable actuating means, a striking means having a hammer and engageable by said actuating means to effect impingement of said hammer upon the respectively adjacent vibrator to excite the latter into vibration, a member coupled to said actuating means and upon movement of the latter ino engagement with said striking means movable away from a position against said adjacent vibrator, a resilient element coupled to said actuating means and normally urging said member against said adjacent vibrator to deflect the latter from said common plane and away from said damping element; and a plurality of control means engageable individually between said striker assemblies and said damping element to move said damping element away from said vibrators in response to excitation of said striking means.

References Cited in the file of this patent

UNITED STATES PATENTS

| | | |
|---|---|---|
| 2,456,321 | Rhodes | Dec. 14, 1948 |
| 2,728,902 | White | Dec. 27, 1955 |
| 2,821,955 | Ehlers | Feb. 4, 1958 |